E. MARTIN, E. N. DAVIE & C. E. THORNTON.
TIRE-TIGHTENER.
No. 179,711. Patented July 11, 1876.
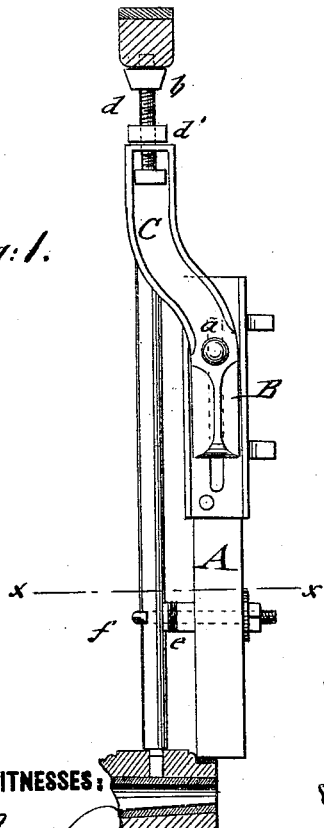
Fig: 1.
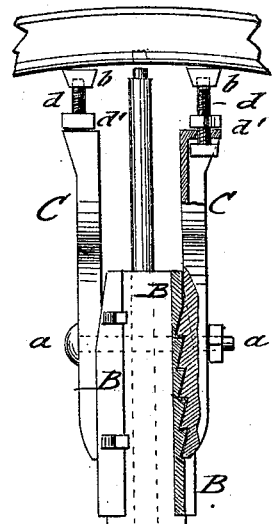
Fig: 2.
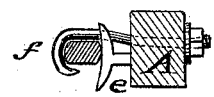
Fig: 3.
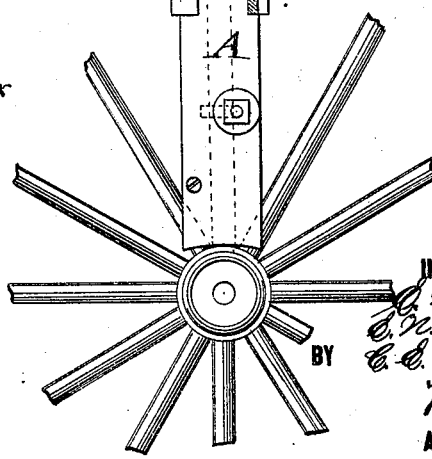
WITNESSES:
Chas. Nida
John Goethals
INVENTOR:
E. Martin
E. N. Davie
C. E. Thornton
BY
ATTORNEYS.

UNITED STATES PATENT OFFICE.

ENSLEY MARTIN, EDWARD N. DAVIE, AND CHARLES E. THORNTON, OF ROCKFORD, MICHIGAN.

IMPROVEMENT IN TIRE-TIGHTENERS.

Specification forming part of Letters Patent No. 179,711, dated July 11, 1876; application filed April 10, 1876.

*To all whom it may concern:*

Be it known that we, ENSLEY MARTIN, EDWARD N. DAVIE, and CHARLES E. THORNTON, of Rockford, in the county of Kent and State of Michigan, have invented a new and Improved Tire-Tightener; and we do hereby declare that the following is a full, clear, and exact description of the same.

In the accompanying drawing, Figures 1 and 2 are respectively a side and front view of our improved device. Fig. 3 is a horizontal section on line $x\,x$, Fig. 1.

Our device is composed of adjustable arms and screw blocks or caps, for pressing against the felly, and a post or standard, which is applied to the hub, and provided with guide-plates attached thereto, in which said arms are secured and adjusted, as hereinafter described.

A represents the main post, which carries, in flanged metallic guide plates or mountings B at the sides, the tightening-arms C and, at the front part, the sliding post D, of the jack. The tightening-arms C are secured by a strong bolt, $a$, to the main post, and adjusted by interlocking-teeth with the toothed and slotted side plates B, to admit the adjustment of the arms to the radius of wheel. The lower part of the main post A is placed on the hub of the wheel, just outside of the spoke-ring, and the lifting-caps $b$ at the upper ends of the arms C, against the under side of the felly, at the side of the spoke. The lifting-caps $b$ are applied to screw-bolts $d$, guided at the ends of the arms C, and moved forward or back by screw-nuts $d'$, which serve to apply the lifting-caps or release them from the felly. The forcing of the felly in outward direction releases the shoulder of the spoke and allows the insertion of a leather or other washer over the spoke end. The lifting-caps are then withdrawn, so that the felly will shrink back upon the washer, increasing the circumference of the fellies and thereby the tightening of the tire upon the same. In case the spoke is liable to rise out of the hub, a bearing, $e$, and retaining-hook $f$, at the lower part of the main post, serve to attach the spoke and hold the same securely in position until replaced into the spoke-mortise by the release of the felly.

What we claim is—

The combination, with a main post, having toothed and slotted side plates of adjustable tire-tightening arms, provided with outer lifting-caps, substantially as and for the purposes set forth.

ENSLEY MARTIN.
EDWARD N. DAVIE.
CHARLES E. THORNTON.

Witnesses:
SMITH LAPHAM,
A. A. TOWER.